J. L. Bates,
Steam Engine Packing.
N° 36,987.
Patented Nov. 25, 1862.

Witnesses:
J. W. Coombs
Chas. A. Fiske

Inventor;
J. L. Bates
per Munn & Co
Attorney

UNITED STATES PATENT OFFICE.

JAMES L. BATES, OF PROVIDENCE, RHODE ISLAND.

IMPROVEMENT IN PACKING FOR STEAM-ENGINES.

Specification forming part of Letters Patent No. 36,987, dated November 25, 1862.

*To all whom it may concern:*

Be it known that I, JAMES L. BATES, of the city of Providence, in the county of Providence and State of Rhode Island, have invented a new and Improved Packing for Stuffing-Boxes and other parts of Steam-Engines, Pumps, and other Apparatus; and I do hereby declare that the following is a full, clear, and exact description of the same, reference being had to the accompanying drawings, form part of this specification, in which—

Figure 1:
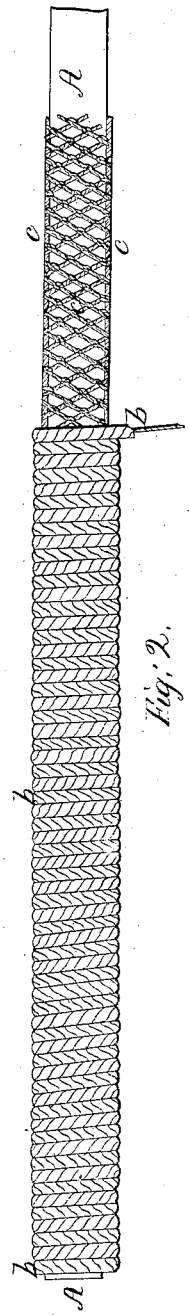
Figure 2:
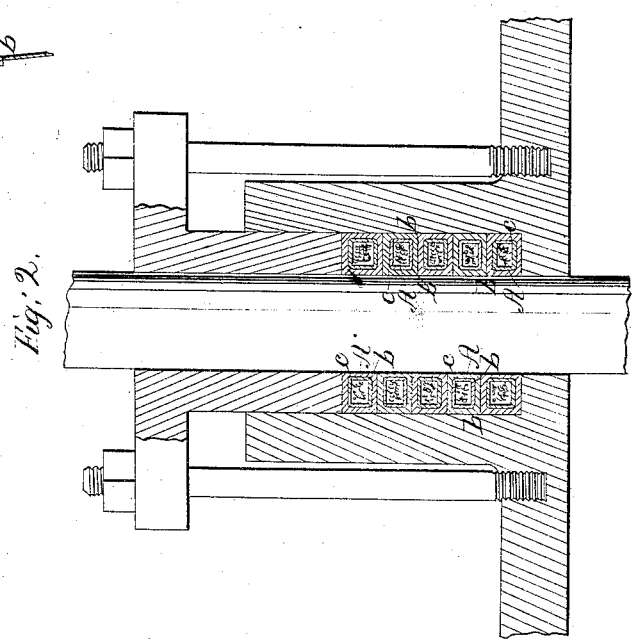

Figure 1 represents a longitudinal view of a piece of my improved packing. Fig. 2 is a central section of a stuffing-box having the packing applied within it.

Similar letters of reference indicate corresponding parts in both figures.

This packing is composed of a fillet or strip of cork covered with twine, which has been first covered with soft cotton or other soft fibrous material.

To enable others to make and apply my invention, I will proceed to describe it with reference to the drawings.

A represents the fillet or strip of cork cut of uniform size, and $b$ the cotton-covered twine with which it is covered.

$c$ is an open braiding, of twine or other light material, braided on the cork before the outer covering, $b$, is applied, its object being to strengthen the cork and enable it to be bent without being broken.

The external covering, $b$, is composed of a twine thickly covered with soft cotton, the cotton being wound upon it in the form of a soft sliver, and the twine being merely to hold the soft cotton together and give it a desirable degree of tenacity. The said covering $b$ is wound closely around the braided fillet of cork. This packing may be made in pieces of any length and kept for use in coils of convenient size, the flexibility of the cork being sufficient to enable it to be coiled up.

The fillet of cork is made in pieces of as great length as can be obtained, or of any convenient length, united by scarf-joints.

One great advantage of the braiding $c$ is that it strengthens and preserves these joints. The said braiding is not, however, indispensable.

The packing is used in the same manner as india-rubber or other packing which is used in fillets or strips.

To prepare it for use, it is first placed in scalding water to render it soft and pliable, after which it is saturated as much as possible with melted tallow, and then coiled up within the stuffing-box, and around the rod or shaft where it is to be used and pressed tight the gland or follower.

The advantages of this packing as compared with india-rubber packing have been demonstrated by actual trial in the stuffing-boxes of a locomotive piston-rod. Of the india-rubber packing, costing one dollar per pound, about one pound is necessary for each stuffing-box. Of my packing, costing but half a dollar a pound, only one-third of a pound is required; hence its first cost is but one-sixth that of india-rubber, but as it is at least three times more durable its real cost is only about one-twentieth that of india-rubber. It is more pliable and sustains a greater pressure than the india-rubber packing, and it does not melt and clog the piston-rod as the india-rubber does.

What I claim as my invention, and desire to secure by Letters Patent, is—

1. The combination of the fillet or strip of cork A and the covering $b$, composed of twine covered with soft cotton or other soft fibrous material, substantially as herein specified.

2. The braiding $c$, applied in combination with the fillet or strip A and covering $b$, substantially as and for the purpose herein specified.

JAMES L. BATES.

Witnesses:
JOHN HEAP,
W. C. GEER.